(12) United States Patent
Reed et al.

(10) Patent No.: US 11,105,190 B2
(45) Date of Patent: Aug. 31, 2021

(54) MULTI-GAUGE COMMUNICATIONS OVER AN ESP POWER BUS

(71) Applicant: Halliburton Energy Services, Inc., Houston, TX (US)

(72) Inventors: Stewart Darold Reed, Spring, TX (US); Srilatha Boyanapally, Stafford, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 261 days.

(21) Appl. No.: 16/327,753

(22) PCT Filed: Oct. 19, 2016

(86) PCT No.: PCT/US2016/057756
§ 371 (c)(1),
(2) Date: Feb. 22, 2019

(87) PCT Pub. No.: WO2018/075037
PCT Pub. Date: Apr. 26, 2018

(65) Prior Publication Data
US 2019/0186246 A1  Jun. 20, 2019

(51) Int. Cl.
*E21B 43/12* (2006.01)
*H04B 3/54* (2006.01)
(Continued)

(52) U.S. Cl.
CPC ............ *E21B 43/128* (2013.01); *E21B 47/13* (2020.05); *H04B 3/54* (2013.01); *H04B 3/56* (2013.01);
(Continued)

(58) Field of Classification Search
CPC .. E21B 43/128; H04B 3/54; H04B 2203/5475
See application file for complete search history.

(56) References Cited

U.S. PATENT DOCUMENTS 5,515,038 A    5/1996  Smith
6,587,037 B1   7/2003  Besser et al.
(Continued)

FOREIGN PATENT DOCUMENTS

WO    2013132234 A1    9/2013
WO    2014120847 A1    8/2014
WO    2014149293 A1    9/2014

OTHER PUBLICATIONS

International Search Report & Written Opinion for Corresponding PCT Application No. PCT/US2016/057756 dated Mar. 28, 2017. (17 pages).

*Primary Examiner* — Cathleen R Hutchins
*Assistant Examiner* — Ronald R Runyan
(74) *Attorney, Agent, or Firm* — McGuireWoods, LLP (57) ABSTRACT

The disclosed embodiments include a power and data delivery system for downhole gauges of a well. The power and data delivery system includes a three-phase power supply coupled to a power cable to supply power to a downhole motor positioned along a wellbore. Additionally, the power cable transmits power and data signals. The power and data delivery system also includes a downhole gauge coupled to the downhole motor, and the downhole gauge transmits downhole data signals along the power cable to a gauge surface panel. Further, the power and data delivery system includes at least one gauge positioned remotely from the downhole gauge and coupled to the power cable. The at least one gauge also transmits gauge data signals along the power cable to the gauge surface panel.

20 Claims, 9 Drawing Sheets

(51) Int. Cl.
*E21B 47/13* (2012.01)
*H04B 3/56* (2006.01)
(52) U.S. Cl.
CPC ........... *H04B 2203/5466* (2013.01); *H04B 2203/5475* (2013.01)

(56) References Cited

U.S. PATENT DOCUMENTS

| | | |
|---|---|---|
| 6,816,082 B1 | 11/2004 | Laborde |
| 7,982,633 B2 * | 7/2011 | Booker .................. H04B 3/54 340/854.9 |
| 8,138,622 B2 | 3/2012 | Layton et al. |
| 2004/0064292 A1 * | 4/2004 | Beck .................. F04B 49/065 702/182 |
| 2005/0110655 A1 | 5/2005 | Layton |
| 2009/0021393 A1 | 1/2009 | Layton et al. |
| 2012/0037354 A1 | 2/2012 | McCoy et al. |
| 2015/0109139 A1 | 4/2015 | Shanks |

* cited by examiner

MULTI-GAUGE COMMUNICATIONS OVER AN ESP POWER BUS

BACKGROUND

The present disclosure relates generally to downhole power systems, and, more specifically, to multiple gauge communication along an electrical submersible pumping (ESP) power bus.

Artificial lift systems, such as ESP systems, are often used in hydrocarbon producing wells to pump fluids from the well up to the surface. A conventional ESP system may include a centrifugal pump and electrical motor that are driven by a three-phase voltage supply and a variable frequency drive (VFD), which are both located at the surface. The three-phase voltage supply and the VFD deliver three-phase power to the electrical motor via a three-phase power cable. Data signals from a downhole gauge may also be transmitted over the power cable to the surface. Such data signals may include various data related to performance of downhole components and downhole instruments.

While data signals are provided to the surface via the downhole gauge and the power cable, the downhole gauge may only produce data from measurements of downhole conditions in the immediate vicinity of the downhole gauge. Further, in some instances, faults on a single phase of the three-phase power cable may make data transmission across the three-phase power cable unreliable. Accordingly, it may be difficult or infeasible to retrieve accurate data relating to conditions along a wellbore within the well or at a wellhead.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to providing multiple gauges in and around a hydrocarbon production environment, and methods and apparatuses to provide communication from the multiple gauges to the surface of the hydrocarbon production environment. More particularly, the present disclosure relates to systems, apparatus, and methods to transmit data from the multiple gauges across a power cable (i.e., a power bus) that is used to power an electrical submersible pumping (ESP) system. Additionally, the gauges may be positioned at multiple locations along tubing within a well or on the surface in the vicinity of the wellhead. As defined herein, tubing may include tubes, wellbore casings, as well as other types of strings that are either permanently deployed along a wellbore or may be retrieved as an operation of hydrocarbon production.

As described herein, embodiments of the present disclosure provide a data delivery system for multiple gauges disposed in or around a hydrocarbon production well. In a generalized embodiment, a three-phase power supply at a surface provides three-phase power to a downhole electrical submersible pumping (ESP) system via a three-conductor power cable. Several gauges may be positioned along the three-conductor power cable, and the gauges may be coupled to the cable using a new splicing location or an existing location, such as at a vent box (i.e., a junction box) at a wellhead of the hydrocarbon production well. The gauges may communicate with a gauge surface panel by transmitting data across the three-conductor cable, and the gauge surface panel functions to collect data recorded by the gauges.

In further embodiments, one or more of the gauges positioned along the three-conductor cable may couple to a single conductor (e.g., phase) of the three-conductor cable. In such embodiments, individual gauges may continue communicating with the gauge surface panel when ground faults or other conductor issues are experienced on the conductors to which other gauges are coupled. Additional descriptions of the foregoing system, apparatus, and method to form electrical connections are described in the paragraphs below and are illustrated in FIGS. 1-11.

Figure 1:
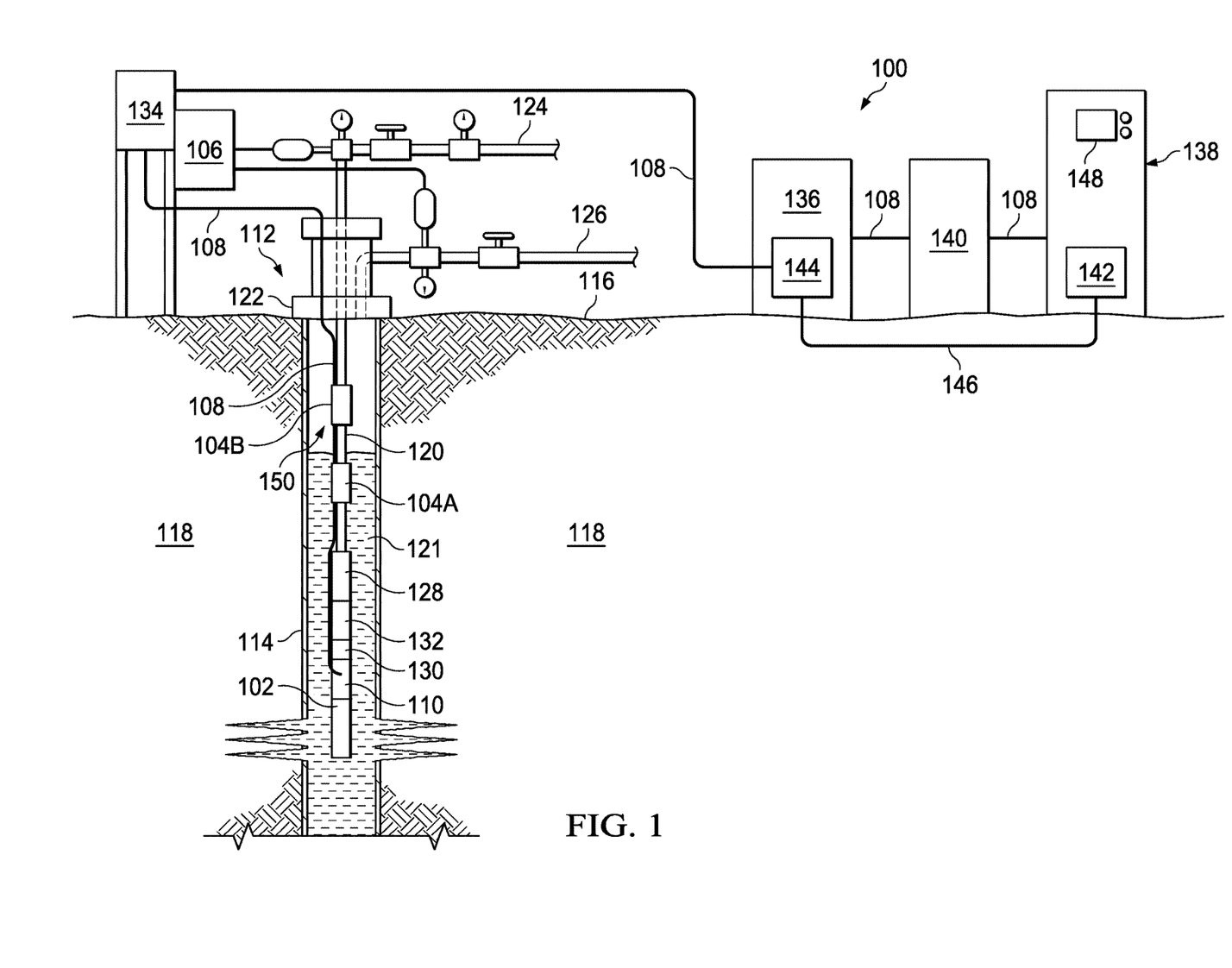
FIG. 1 is a schematic, side view of a hydrocarbon production environment including multiple gauges coupled to a three-phase power cable, which provides power to an electrical submersible pumping (ESP) motor.

Turning now to the figures, FIG. 1 is a schematic, side view of a hydrocarbon production environment 100 where a downhole gauge 102, tubing gauges 104A and 104B, and wellhead gauge 106 are coupled to a three-phase power cable 108 that provides power to an electrical submersible pumping (ESP) motor 110. In the embodiment of FIG. 1, a well 112 having a wellbore 114 extends from a surface 116 of the well 112 to or through a subterranean formation 118. Production tubing 120 may be positioned within the well 112 to provide a path for production fluids 121 to travel to the surface 116. A wellhead 122 may provide a path for the production tubing 120 to exit the well 112, and the wellhead 122 may provide paths 124 and 126 for the production fluids 121 and gas to be collected from the well 112, respectively.

Also included along the production tubing 120 is a pump 128, which is powered by the ESP motor 110. Additionally, a protector 130 may be included along the production tubing 120 to protect the ESP motor 110 from the production fluids 121 entering the ESP motor 110. Further, a gas separator 132 may be included along the production tubing 120 to prevent free gas from entering the pump 128.

At the surface 116, a junction box 134 (i.e., a vent box) may provide an access point to the power cable 108 for the wellhead gauge 106, and the junction box 134 may also provide a venting mechanism to vent any gas that may be present along the power cable 108. Further, the junction box 134 provides a junction between a portion of the power cable 108 that penetrates the wellhead 122 and a portion of the power cable 108 that is coupled to a step-up transformer 136. The step-up transformer 136 may receive power from a variable frequency drive (VFD) 138, and step-up a voltage level of the power received from the VFD 138 to a voltage level sufficient to power the ESP motor 110. Further, the VFD 138 may regulate motor speed of the ESP motor 110 by varying power frequency and voltage applied to the ESP motor 110. Coupling the step-up transformer 136 to the VFD 138 is a sinewave filter (SWF) 140.

During production at the well 112, an operator may generally be available to monitor the VFD 138 and a gauge surface panel 142 coupled to the VFD 138. Accordingly, data provided by the gauges 102, 104A, 104B, and 106 may be displayed on the VFD 138 or a display associated with the gauge surface panel 142. With this in mind, the gauges 102, 104A, 104B, and 106 may provide data signals across the power cable 108 to the step-up transformer 136. At the step-up transformer 136, the data signals may be transferred by a gauge choke 144, which connects to the wye point of the 3-phase system via power cable 108, to a communication/gauge power line 146. The communication/gauge power line 146 provides the data signals to the gauge surface panel 142 and also provides appropriate power to the gauges. At the gauge surface panel 142, the data signals may be filtered and processed for display at a display 148 the VFD 138 or for local storage and/or conventional remote transmission processes (e.g., cellular or satellite modems).

The gauges 102, 104A, 104B, and 106 may measure different ESP system operating conditions in a vicinity of the gauges 102, 104A, 104B, and 106. For example, the downhole gauge 102 may be coupled to the ESP motor 110 at a bottom portion of the production tubing 120. The downhole gauge 102 may measure the temperature around the ESP motor 110, pressure of the well 112 near the ESP motor 110, vibration of the production tubing 120 near the ESP motor 110, or any other ESP system operating condition that is experienced near the ESP motor 110. Similarly, the tubing gauges 104A and 104B may measure similar ESP system operating conditions, but the tubing gauges 104A and 104B may measure the operating conditions at varying points along the production tubing 120. For example, the tubing gauge 104A may measure the ESP system operating conditions uphole from the pump 128 but downhole from a surface of the fluid 121 within the well 112. Further, the tubing gauge 104B may also measure the ESP system operating conditions uphole from the pump 128, but the tubing gauge 104B may also be positioned uphole from the surface of the fluid 121 within the well 112. Moreover, the wellhead gauge 106 may provide measurements for tubing pressure and casing pressure at the wellhead 122. Further, the wellhead gauge 106 may also measure surface production fluid temperature, surface production tubing vibration and acoustics, surface casing tubing vibrations and acoustics, and any other ESP system operating conditions at the wellhead 122 that may be valuable for the wellhead gauge 106 to monitor.

The addition of data from the tubing gauges 104A and 104B may provide a window into pre-failure analysis and automated interventions. For example, monitoring a pressure differential over a specified length of production tubing 120 may provide a basis for running real time algorithms that detect a buildup of paraffin in the production tubing 120. Further, monitoring tubing condition vibrations may help confirm or detect whether sand slugs are traveling to the surface 116 or detect a likelihood of sand suspensions whirling in the production tubing 120. Moreover, monitoring an annulus 150 may immediately alert the gauge surface panel 142 or an operator of a "gas kick" occurring when a slug of fluid is pushed to the surface 116 via a casing of the well 112. Knowing a true distribution of temperature and pressure along the production tubing 120 may yield accurate pressure, volume, temperature (PVT) fluid analysis and an accurate determination of voltage drop in the power cable 108.

In addition to the valuable data produced by the tubing gauges 104A and 104B, the tubing gauges 104A and 104B may also offer a mechanical enhancement to the way the power cable 108 is deployed. For example, each of the tubing gauges 104A and 104B includes a splice connection for the power cable 108 such that the gauge 104A or 104B can electrically couple to the power cable 108. Generally, a power cable 108 is spliced in the field using extensive hands-on processes to connect two spools of the power cable 108. Splicing methods may be cumbersome in adverse weather conditions and may include inherent reliability issues. The tubing gauges 104A and 104B may function as a mechanical splice that is quickly performed. Additionally, because the splice is no longer performed by hand, the splice may be subject to fewer human generated quality flaws. The mechanical splice of the tubing gauges 104A and 104B may also provide a rigid connection to the production tubing 120 thereby replacing bands or clamps to couple the power cable 108 to the production tubing 120 in the vicinity of the tubing gauges 104A and 104B.

Figure 2:
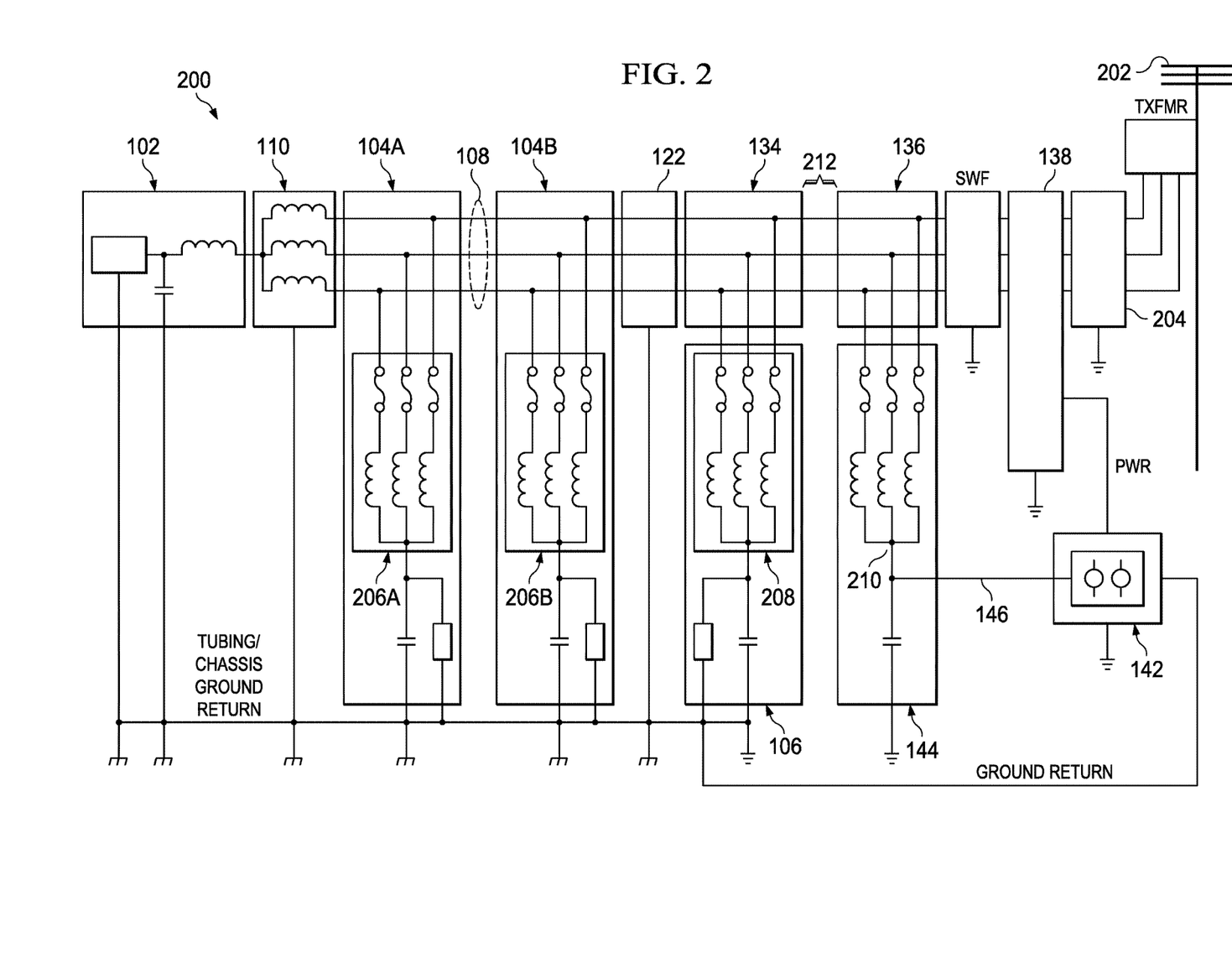
FIG. 2 is a circuit diagram of the hydrocarbon production environment of FIG. 1, including multiple gauges coupled to the power cable.

FIG. 2 is a circuit diagram 200 of the hydrocarbon production environment 100 of FIG. 1, including the DC powered gauges 102, 104A, 104B, and 106 coupled to the power cable 108. The hydrocarbon production environment 100 of FIG. 1 may receive power from a utility 202, and the environment 100 may be disconnected from the utility by a disconnect switch 204. The gauges 102, 104A, 104B, and 106 may be coupled to wye points of the ESP motor 110, tubing gauge chokes 206A and 206B, and a wellhead gauge choke 208, respectively, that couple to the power cable 108. Because the gauges 102, 104A, 104B, and 106 are coupled to the wye points, and a three-phase power bus of an ESP system is a floating system, a supply voltage may be imposed onto a wye point 210 at the gauge choke 144 coupled to the step-up transformer 136 and subsequently to the power cable 108 for the purpose of powering the gauges 102, 104A, 104B, and 106 without using an additional power bus run downhole.

Additionally, the wye point 210 at the gauge choke 144 may also facilitate the communication line 146 to communicate data from the gauges 102, 104A, 104B, and 106 across the power cable 108 and to the gauge surface panel 142. Communication across the power cable 108 may be accomplished by the gauges 102, 104A, 104B, and 106 by modulating current consumption by the gauges 102, 104A, 104B, and 106 either using an amplitude modulation scheme or a frequency modulation scheme. Modulated current may be detected by the gauge surface panel 142 that also functions as a power source for the gauges 102, 104A, 104B, and 106. Therefore, a strategy of using the ESP power bus (i.e., the power cable 108) as a gauge power and communication physical layer provides a cost effective and reliable means for deploying downhole gauges that intrinsically cover a long communication distance.

ESP installations may be completed where the wellhead 122 is located large distances away from the VFD 138. These distances can be anywhere from hundreds of feet up to a mile. Installing separate instrumentation and power wires for monitoring parameters at the wellhead 122, such as casing and tubing pressures, may be very costly and in some cases impractical. For example, a location 212 between the VFD 138 and the wellhead 122 may include a route for tanker trucks to access battery tanks of a well pad. The power cable 108 at the location 212 may be buried from the wellhead 122 to a position near the VFD 138. To avoid burying instrumentation wires under the location 212, which may be costly and sensitive to an environment in which they are located, the wellhead gauge 106 is positioned at the junction box 134. The junction box 134, which is located in physical proximity to the wellhead 122, may provide a connection point for the wellhead gauge 106 to the power cable 108 such that the wellhead gauge 106 may transmit data signals along the power cable 108 to the gauge surface panel 142. Because the junction box 134 is located near the wellhead 122, the wellhead gauge 106 coupled to the junction box 134 may use relatively short instrument cable runs from the wellhead 122 to the wellhead gauge 106 in relation to a length of the instrument cable runs with the wellhead gauge 106 located at the VFD 138. Accordingly, the wellhead gauge 106 located at the junction box 134 may limit cost associated with a lengthy instrument cable run and increase reliability and robustness of the wellhead gauge 106.

Figure 3:
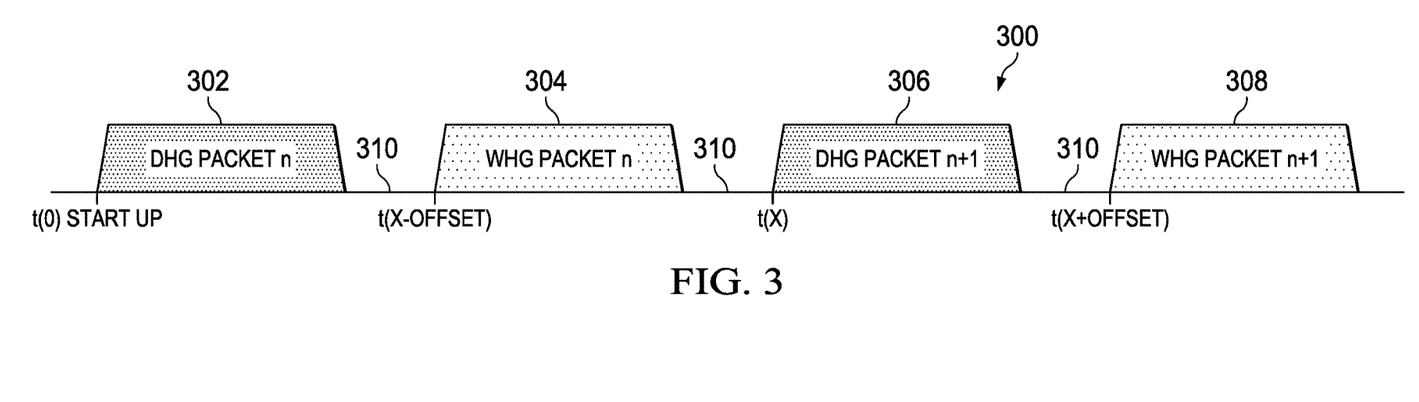
FIG. 3 is a data packet timing diagram for a downhole gauge and a wellbore and/or wellhead gauge to provide data transmission over the power cable without transmission overlap.

Turning now to FIG. 3, a timing diagram 300 for the downhole gauge 102 and the wellbore gauge 106 of FIGS. 1 and 2 to provide data transmission over the power cable 108 without transmission overlap is illustrated. While the timing diagram 300 provides an illustration of data transmission from the downhole gauge 102 and the wellbore gauge 106, it may be appreciated that the data transmission could also be from the tubing gauges 104A and 104B or any other gauges coupled to the power cable 108 of FIGS. 1 and 2. Further, more than two gauges coupled to the power cable 108 may be used in a similar manner to the timing diagram 300. For example, a similar technique may apply to a system that includes four or more gauges coupled to the power cable 108.

The gauges 102 and 106 may communicate with the gauge surface panel 142 of FIGS. 1 and 2 by modulating current consumed by the gauges 102 and 106. However, such gauge signal modulation may not be functional if multiple gauges attempt to communicate over the power cable 108 at the same time. Accordingly, the timing diagram 300 provides an indication of how the downhole gauge 102 and the wellbore gauge 106 may communicate across the power cable 108 without interfering with the transmission of data from the other gauge 102 or 106. As illustrated, at time t(0), a data packet 302 from the downhole gauge 102 is transmitted across the power cable 108. Subsequently, at time t(X−offset), a data packet 304 from the wellbore gauge 106 is transmitted across the power cable 108. At time t(X), a data packet 306 from the downhole gauge 102 is transmitted across the power cable 108, and, at time t(X+offset), a data packet 306 from the wellbore gauge 106 is transmitted across the power cable 108. In this manner the data packets 302, 304, 306, and 308 may be transmitted across the power cable 108 without interference from the other data packets. Further, between the transmission of the data packets 302, 304, 306, and 308, a buffer 310 may be established. The buffer 310 may provide time separation between transmission of the data packets 302, 304, 306, and 308 to avoid overlapping transmissions across the power cable 108.

While the gauges 102 and 106 may only communicate using one way transmissions (i.e., the gauges 102 and 106 only communicate uphole), the timing diagram 300 may be established by programming the gauges 102 and 106 to repeatedly transmit data for a specified amount of time after a time interval X has passed. That is, if the time interval X is one minute, the downhole gauge 102 will transmit the data packet 302 upon start-up of an ESP system. Subsequently, the downhole gauge 102 will transmit the data packet 306 after a minute has passed from the start-up time. Additionally, the wellhead gauge 106 will transmit the data packet 304 in between the transmission of the data packets 302 and 306. For example, an offset value may be thirty seconds. Accordingly, the wellhead gauge 106 may transmit the data packet 304 thirty seconds after the start-up time, and the wellhead gauge 106 may also transmit the data packet 308 one minute and thirty seconds after the start-up time. The data packets 302, 304, 306, and 308 may all be transmitted across the power cable 108 over a twenty second period, and the buffer 310 may be a ten second period. When the gauges 102 and 106 are not transmitting the data packets 302, 304, 306, and 308, the gauges 102 and 106 may enter a dormant bus state during which the gauges 102 and 106 collect data but do not transmit any data across the power cable 108.

The gauge surface panel 142 may determine from which of the gauges 102 and 106 a received data packet originated. For example, the gauge surface panel 142 may maintain a data packet counter or an odd-even data packet organizer to align data packets with the correct gauge 102 or 106. Additionally, the gauges 102 and 106 may add a leading identifier field to a transmitted data packet. It may be appreciated that the method described above in relation to the timing diagram 300 may apply to either DC or AC powered gauges 102, 104A, 104B, and 106. It may also be appreciated that the timing sequences described within are examples and may be adjusted to ascertain a desired data transmission rate and increased operability.

In an event that the data packets 302, 304, 306, and 308 become unsynchronized and begin imposing data bits upon each other, the gauge surface panel 142 may detect an error and trigger a recovery action. The errors may occur for multiple reasons. For example, the downhole gauge 102 may experience temperature drifts in internal circuitry of the downhole gauge 102 causing timing oscillators or crystals to lose accuracy. Errors may also be a result of aging of a timing circuit or a slight inconsistency in integrated circuit (IC) device quality control. Over time, small biases and inaccuracies may add up and result in data packet encroachment.

Errors may be detected by the gauge surface panel 142 by utilizing a standard control redundancy check (CRC) field appended to each data packet. Additionally, an error check mechanism may be conducted by monitoring data transmission across the power cable 108 for an excessive high state or abnormal current modulation state. For example, if both gauges 102 and 106 simultaneously produce a high bit on the power cable 108, the current consumption detected by the gauge surface panel 142 may be abnormally high for either a high state for either of the gauges 102 or 106. The abnormally high signal may be a result of a multi-gauge topology presenting two gauges 102 and 106 in a parallel circuit. If both gauges 102 and 106 attempt to consume a high current at the same time, the overall current consumption seen by the gauge surface panel 142 will be the summation of current consumption of both of the gauges 102 and 106.

An additional technique for the gauge surface panel 142 to detect an error may be designing each of the gauges 102 and 106 with unique high states. That is, each of the gauges 102 and 106 may be designed to consume current for data transmission at a level distinguishable by the gauge surface panel 142. If, while receiving a data packet 302 or 306 from the downhole gauge 102, a high state unique to the wellhead gauge 106 is detected, an error indication may be triggered. Once an error is detected by the gauge surface panel 142 by any method, both gauges 102 and 106 may be quickly re-synchronized by allowing the gauge surface panel 142 to perform an automatic power cycle on the gauges 102 and 106 to restart internal timers of the gauges 102 and 106.

Figure 4:
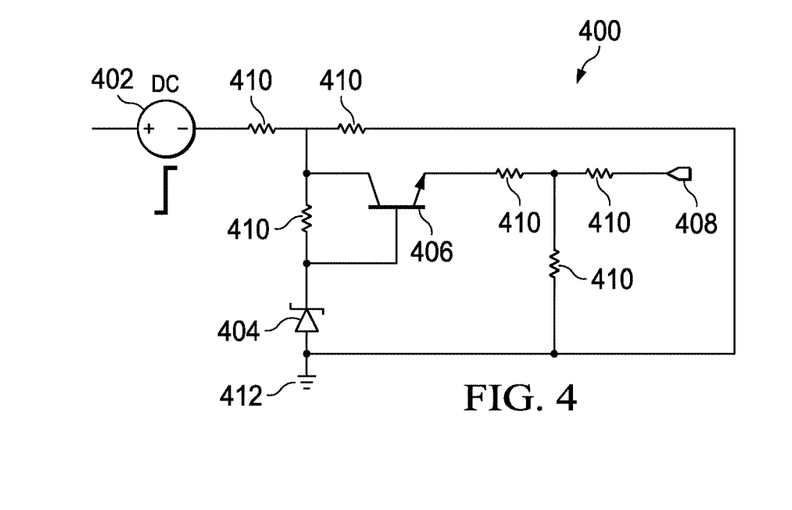
FIG. 4 is an example circuit diagram of a system that provides a DC power voltage level indication to a gauge to begin transmitting data.

FIG. 4 is circuit diagram of a system 400 that provides an indication to a gauge to begin transmitting data. A communication method for transmitting data packets across the power cable 108 may involve biasing a power supply voltage that is imposed on the wye point 210 from the gauge surface panel 142. Each power supply bias may be uniquely purposed for triggering communication from a specific gauge 102, 104A, 104B, or 106. Further, each of the gauges 102, 104A, 104B, and 106 may discover the bias and respond by transmitting a data packet across the power cable 108. Such a technique may be applied to both DC or AC powered gauges.

By way of example, the downhole gauge 102 may be designed to respond to a 150 VDC supply voltage whereas the wellhead gauge 106 may be designed to respond to a 100 VDC supply. The minimum supply voltage required for gauge operations could be 100 VDC or less such that both gauges 102 and 106 continuously collect and convert data from their respective transducers regardless of whether the gauges 102 and 106 are transmitting data. Standard power supply circuits may buck or divide any excess voltage per normal operation.

The system 400 may monitor a voltage supply 402. This may be accomplished with commonly available voltage regulator or management ICs or basic circuitry that utilizes diode and/or other biasing methods, such as the circuitry depicted in the system 400. It may be appreciated that numerous designs may achieve this functionality, but all are contemplated as within the scope of the present disclosure. For example, a simple DC circuit may be built using a Zener diode 404 and a transistor 406 to generate a high or a low state to be fed into an input/output (I/O) port 408 of the gauges 102, 104A, 104B, and 106. Based on the configuration of resistors 410, the Zener diode 404, the transistor 406, and the I/O port 408, a high bias between the voltage supply 402 and ground 412 would result in the Zener diode 404 conducting and activating the transistor 406. While the transistor 406 is activated, a high state may be generated on the I/O port 408. Alternatively, when the bias between the voltage supply 402 and the ground 412 is small, the Zener diode 404 is not active and the transistor 406 is also inactive. The I/O port 408 may be pulled low via a configuration of the resistors 410. Additionally, the resistors 410 may be used to both limit current at the Zener diode 404, the transistor 406, and the I/O port 408, and to scale voltages to usable ranges (e.g., to a usable high signal at the I/O port 408).

Further, the resistors 410 may provide a mechanism to change an active voltage range for the gauges 102, 104A, 104B, and 106. For example, if the downhole gauge 102 transmits data when the voltage supply 402 provides 150 VDC to the system 400, then the resistors 410 may be chosen in such a manner that a voltage of approximately 150 VDC supplied by the voltage supply 402 will activate the Zener diode 404 resulting in a high state status applied to the I/O port 408. By receiving the high state status at the I/O port 408, a logic signal may be supplied to firmware of the gauge 102, 104A, 104B, or 106 to begin transmitting a data packet. Once the gauge surface panel 142 has received the entire data packet, the gauge surface panel 142 may automatically reset the supply voltage bias to signal the gauge 102, 104A, 104B, or 106 to enter a hibernate mode. As mentioned above, the hibernate mode may involve the gauges 102, 104A, 104B, and 106 collecting data but withholding data transmission across the power cable 108.

Figure 5:
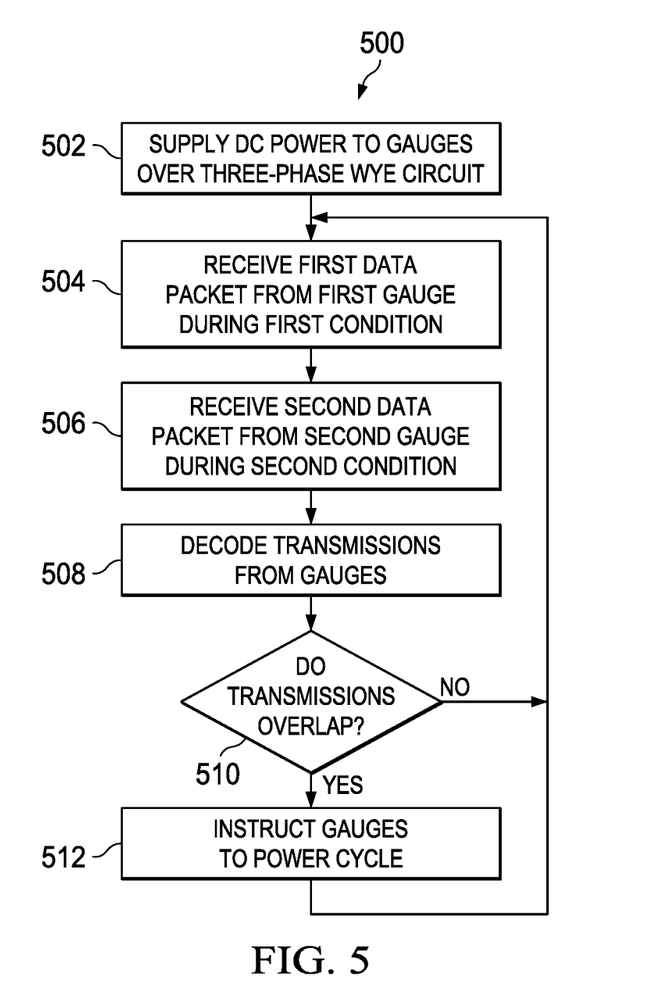
FIG. 5 is a flow chart of a process to transmit data over the power cable from DC powered gauges and to implement gauge reset when data packet overlap is detected.

FIG. 5 is a flow chart of a process 500 to transmit data over the power cable 108 of FIG. 1 from DC powered gauges 102, 104A, 104B, and 106. At block 502, the gauge surface panel 142 may impose a DC supply voltage on the power cable 108 to provide power to the gauges 102, 104A, 104B, and 106 when the gauges 102, 104A, 104B, and 106 are DC powered gauges. Imposing the DC supply voltage on the power cable 108 may be accomplished regardless of a state of the three-phase power supplied to the ESP motor 110.

At block 504, a first data packet may be received at the gauge surface panel 142 from a first gauge 102, 104A, 104B, or 106 during a first condition. Subsequently, at block 506, a second data packet may be received at the gauge surface panel 142 from a second gauge 102, 104A, 104B, or 106 during a second condition. While described as the second data packet, the second data packet received at block 506 may also be defined as an initial data packet provided by the second gauge 102, 104A, 104B, or 106. It may also be appreciated that additional gauges may be included within the process 500. For example, data packets from four or more gauges 102, 104A, 104B, and 106 may be received at the gauge surface panel 142 individually and in a predetermined order. Further, the first condition, the second condition, and any additional condition merited by the addition of more gauges may represent a timing block during which the gauges 102, 104A, 104B, and 106A are programmed or designed to transmit the data packets across the power cable 108, as described in detail in the discussion of FIG. 3. Additionally, the conditions may also be established by receiving different DC voltage values at the gauges 102, 104A, 104B, and 106 when the gauges 102, 104A, 104B, and 106 are programmed or designed to transmit the data packets upon receiving a specific voltage value, as discussed in detail in the discussion of FIG. 4. Accordingly, at any given time, the power cable 108 may include data packet transmissions from an individual gauge 102, 104A, 104B, or 106 or no data packet transmissions at all.

Because the transmission timing of the gauges 102, 104A, 104B, and 106 may be compromised for various reasons (e.g., temperature drifts in internal circuitry causing oscillators or crystals to be inaccurate), the gauge surface panel 142 may monitor and decode the data packet transmissions from the gauges 102, 104A, 104B, and 106 at block 508. By monitoring the data packet transmissions, the gauge surface panel 142 may determine if any of the data packet transmissions from one gauge 102, 104A, 104B, or 106 are overlapping with the data packet transmissions of another gauge 102, 104A, 104B, or 106. An error may be determined by using a standard control redundancy check (CRC) field appended to each data packet transmitted across the power cable 108. Additionally, an error check mechanism may be performed by monitoring an excessive high state or abnormal current modulation state. For example, if multiple gauges 102, 104A, 104B, or 106 simultaneously produce a high bit, the current consumption detected by the gauge surface panel 142 will be abnormally high for a high state of any of the individual gauges 102, 104A, 104B, or 106. Further, each gauge 102, 104A, 104B, and 106 may provide a unique high state on the power cable 108. If, while receiving a data packet from one gauge 102, 104A, 104B, or 106, a high state unique to another gauge 102, 104A, 104B, or 106 is detected, the gauge surface panel 142 may provide an indication that an error has occurred.

At decision block 510, a determination is made as to whether any data packet transmissions overlap using the techniques described above. Once an error is detected, the gauges 102, 104A, 104B, and 106 may be quickly re-synchronized when the gauge surface panel 142 performs an automatic power cycle, at block 512, to restart internal timers of the gauges 102, 104A, 104B, and 106. Upon restarting the gauges 102, 104A, 104B, and 106, the process 500 may return to block 504 to once again receive a first data packet from a first gauge 102, 104A, 104B, or 106. Additionally, should the gauge surface panel 142 make a determination that the data packet transmissions do not overlap, at decision block 510, then the process 500 may repeat from block 504 without instructing the gauges 102, 104A, 104B, and 106 to re-synchronize.

Figure 6:
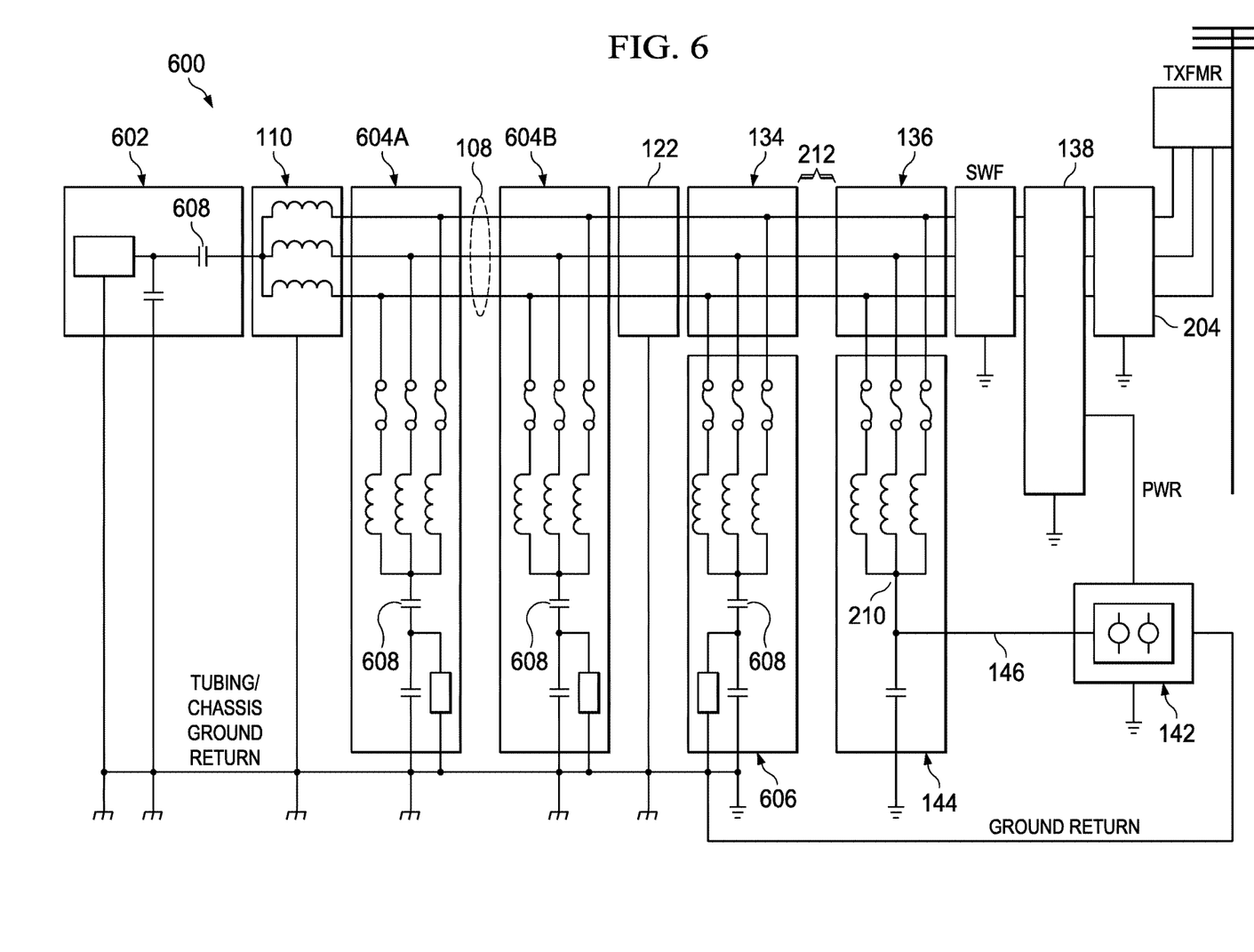
FIG. 6 is a circuit diagram of the hydrocarbon production environment of FIG. 1, including multiple AC powered gauges coupled to the power cable.

Turning now to FIG. 6, a circuit diagram 600 of the hydrocarbon production environment 100 of FIG. 1, including multiple AC powered gauges 602, 604A, 604B, and 606 coupled to the power cable 108, is illustrated. The AC powered gauges 602, 604A, 604B, and 606 may couple to the power cable 108 in a similar manner to the DC gauges 102, 104A, 104B, and 106 except that the AC powered gauges 602, 604A, 604B, and 606 include a capacitive coupling 608 that may enable powering the gauges 602, 604A, 604B, and 606 using an AC power source. For example, the gauge surface panel 142 may impose an additional AC power signal on the power cable 108 in place of a DC power signal to power the gauges 602, 604A, 604B, and 606. The AC powered gauges 602, 604A, 604B, and 606 may provide greater efficiency in transmitting data packets across the power cable 108.

It may be appreciated that while FIG. 6 depicts the AC powered gauges 602, 604A, 604B, and 606, a frequency modulation scheme, as discussed below in the discussion of FIGS. 7-9, may apply to either an AC or a DC powered gauge system. For example, the frequency modulation scheme may also apply to the DC powered gauges 102, 104A, 104B, and 106 described above in the discussion of FIG. 2. Frequency modulation may be defined as a non-stationary type event where a gauge 602, 604A, 604B, or 606 modulates current at a specific frequency for a defined duration. The defined duration may correspond to a one bit width.

Figure 7:
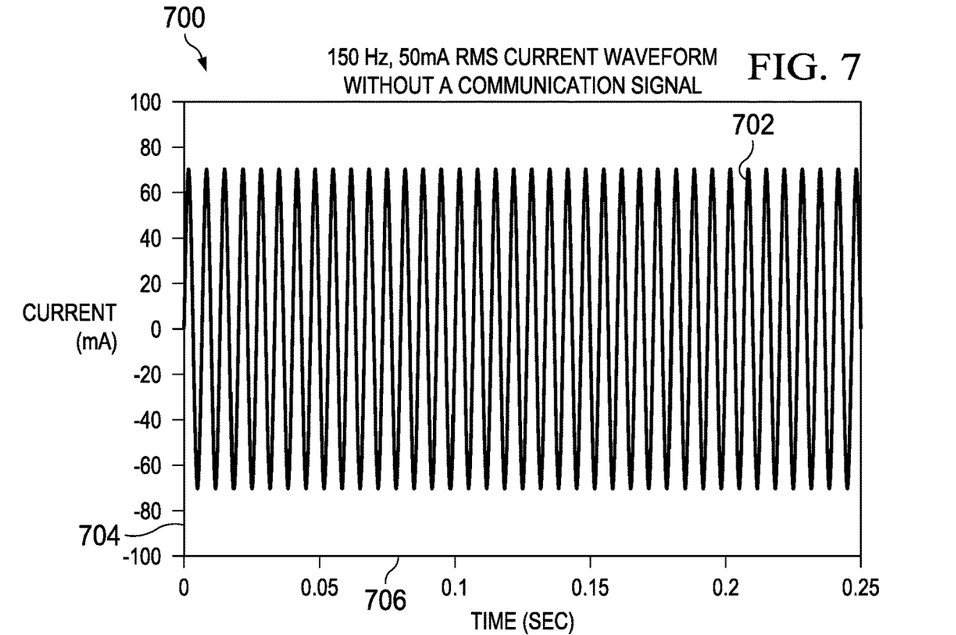
FIG. 7 is an alternating current waveform of a gauge without a data signal.
Figure 8A:
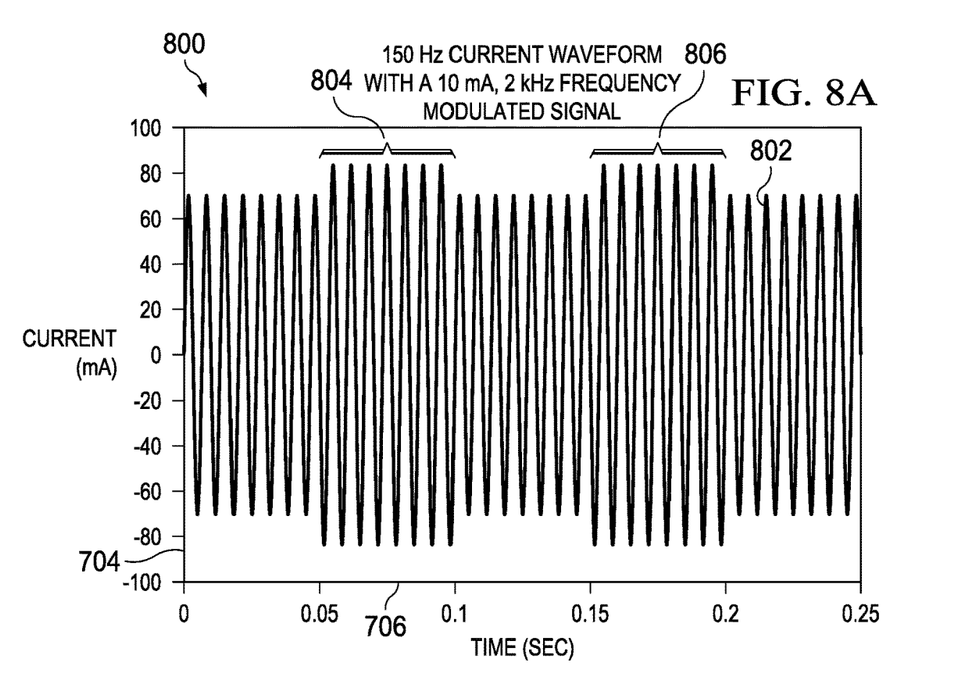
FIG. 8A is a current waveform of FIG. 7 with an imposed frequency modulated data signal from a gauge.
Figure 8B:
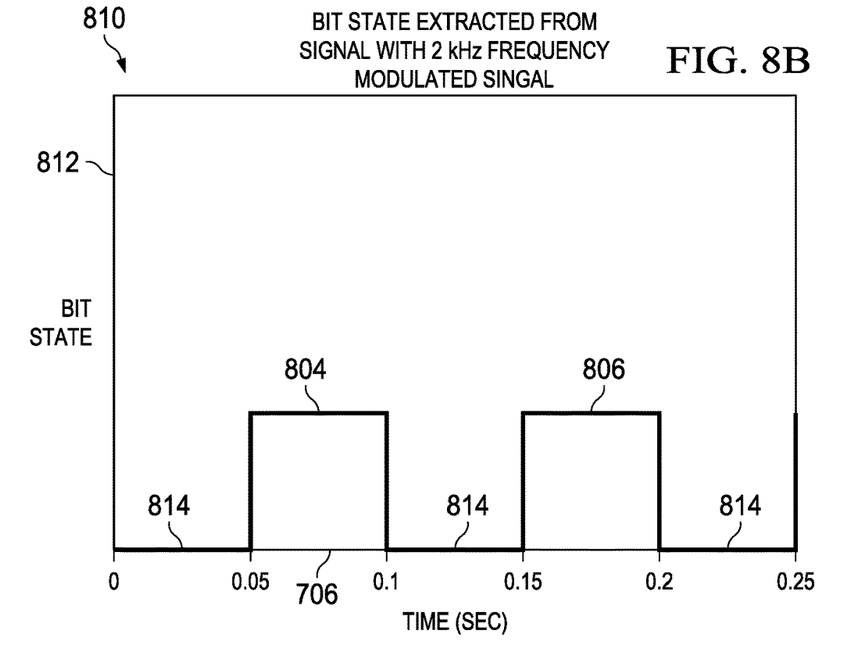
FIG. 8B is a bit state diagram extracted from the gauge data signal of FIG. 8A.

To help illustrate, FIG. 7 is a current waveform 700 without a communication signal. The current waveform 700 includes a signal 702, an ordinate 704 representing a current of the signal 702, and an abscissa 706 that represents time in seconds. Additionally, the signal 702, as illustrated, is a 150 Hz AC signal. The 150 Hz AC signal is used to provide an easily interpreted graph. The signal 702, in operation, may generally be a signal of greater than 500 Hz. Further, the signal 702 may consume 50 mA (RMS) of current during operation.

The gauges 602, 604A, 604B, and 606 may each have different frequency modulated signals when transmitting data across the power cable 108. For example, the gauge 602 may use a 2 kHz frequency modulated signal and the gauge 606 may use a 7 kHz frequency modulated signal. Additionally, the gauges 604A and 604B may each use different frequencies for their respective frequency modulated signals. The gauge surface panel 142 may be able to recognize from which of the gauges 602, 604A, 604B, and 606 the data transmitted across the power cable 108 originates based on the frequency of the frequency modulated signals.

For example, when the gauge 602 transmits data over the power cable 108, it may impose a 2 kHz, 10 mA frequency modulated signal onto the 150 Hz, 50 mA frequency modulated signal 702. With this in mind, FIG. 8A is a current waveform 800 of a frequency modulated signal 802 that includes an imposed data signal from the gauge 602. Similar to FIG. 7, FIG. 8A includes the ordinate 704 representing current and the abscissa 706 representing time. By imposing the 2 kHz, 10 mA signal on the 150 Hz signal 702, the resulting frequency modulated signal 802 includes durations 804 and 806 during which the gauge 602 transmits the 2 kHz, 10 mA signal across the power cable 108. For example, when the gauge 602 intends to transmit a high bit, the gauge 602 may impose the frequency modulated signal onto the power cable 108 for a bit length amount of time (e.g., 0.05 seconds, which yields a baud rate of 20). Accordingly, the periods 804 and 806 may represent high bits transmitted by the gauge 602.

By using analog or digital filtering schemes, the frequency modulated signal 802 may be filtered into the two separate frequencies (e.g., 150 Hz and 2 kHz), and a bit state may be extracted from the 2 kHz signal transmitted by the gauge 602 across the power cable 108. Using the filtered signals, FIG. 8B provides a bit state diagram 810 extracted from the 2 kHz signal transmitted by the gauge 602. In the bit state diagram 810, the abscissa 706 remains representing time, while an ordinate 812 represents a bit state of the signal provided by the gauge 602. For example, the periods 804 and 806 are represented as high signals while a remainder of the bit state diagram 810 is represented as low signals 814. Additionally, because bit width is relatively large (e.g., 0.05 seconds), beginning and end points of the signal provided by the gauge 602 may be localized by a moderately fast brute force sampling method and/or a comparator method. Moreover, localizing the beginning and end points of the signal provided by the gauge 602 may also be accomplished with a purposefully design rectifier circuit capable of transforming an analog signal into a near square wave similar to the bit state diagram 810 of FIG. 8B. In this manner, data from the gauge 602 is transmitted across the power cable 108 to the gauge surface panel 142 using a frequency modulation scheme.

Figure 9A:
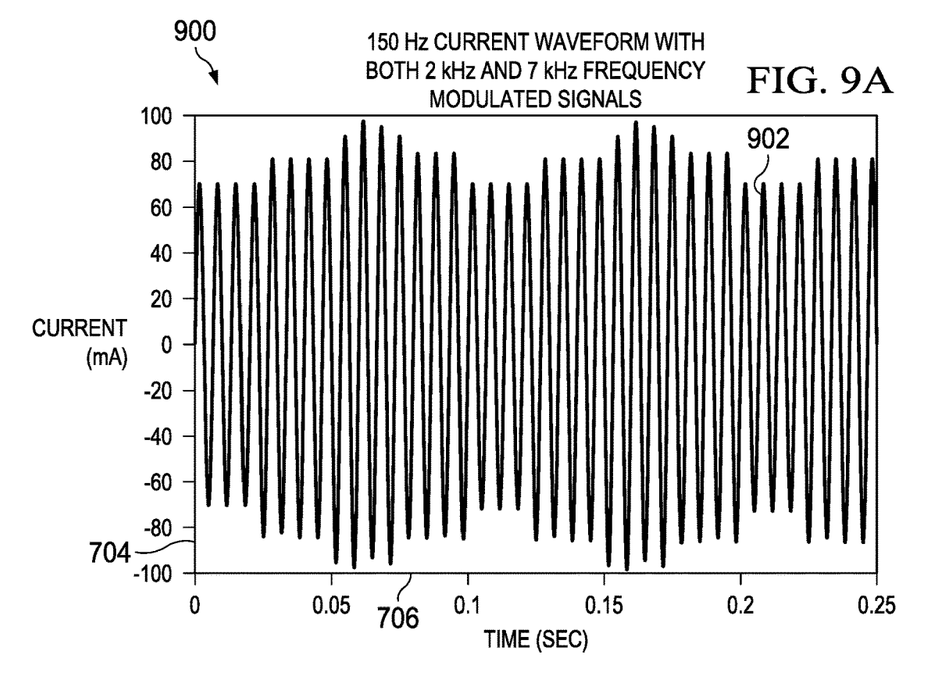
FIG. 9A is a current waveform of FIG. 7 with imposed overlapping data signals from two gauges both with differing frequency modulations.

FIG. 9A is a current waveform 900 of the frequency modulated signal 702 of FIG. 7 with imposed data signals from two gauges 602 and 606 simultaneously. The imposed data signals on the 150 Hz signal 702 produce a frequency modulated signal 902. It may be appreciated that while the frequency modulated signal 902 includes data signals from two gauges 602 and 606, any number of gauges 602, 604A, 604B, and 606 may be imposed on the 150 Hz signal 702 simultaneously to produce the frequency modulated signal 902. As in the previously disclosed current waveforms 700 and 800, the current waveform 900 includes the ordinate 704 representing current and the abscissa 706 representing time. Additionally, the frequency modulated signal 902 includes signals from the gauge 602 transmitting at a 2 kHz frequency and the gauge 606 transmitting at a 7 kHz frequency, both of which are imposed on the 150 Hz frequency modulated signal 702.

Figure 9B:
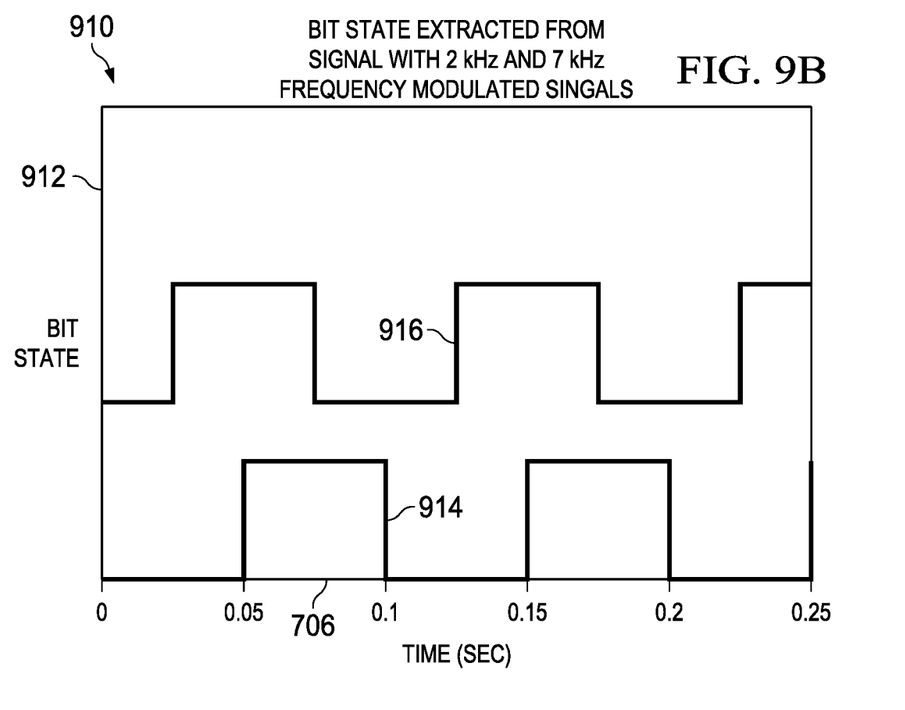
FIG. 9B is a bit state diagram extracted from the data signals of the two gauges of FIG. 9A.

FIG. 9B provides a bit state diagram 910 extracted from the 2 kHz signal transmitted by the gauge 602 and the 7 kHz signal transmitted by the gauge 606. The bit state diagram 910 includes the abscissa 706 representing time and an ordinate 912 representing a bit state of data signals 914 and 916 from the gauges 602 and 606, respectively. An analog or digital signal filtering process (e.g., a band pass filter) may be used to separate the frequency modulated signal 902 into three separate waveforms (e.g., 150 Hz, 2 kHz, and 7 kHz) to isolate each of the different frequencies. Further, the 2 kHz and 7 kHz frequency signals may be transformed into the bit states depicted in FIG. 9B. Accordingly, it may be appreciated that two or more data signals from two or more of the gauges 602, 604A, 604B, and 606 may be transmitted across the power cable 108 simultaneously using the frequency modulation scheme without interfering with one another.

Further, a more sophisticated approach that provides a robust and accurate solution may be obtained using advanced digital signal processing (DSP) methods for localizing non-stationary communication bits in both the frequency and time domain, such as a discrete wavelet transform (DWT). The DWT may decompose a raw signal (e.g., the frequency modulated signal 902) into a three-dimensional transformation that may then be filtered to extract a desired frequency component while maintaining a time domain position of the desired frequency component. The filtered transformation may then be reconstructed into the time domain thereby accurately showing bit positions. The DWT may provide a sharper resolution and ability to filter out high energy random noises when compared with other DSP transformations. However, other DSP strategies (e.g., sliding fast Fourier transform (FFT), short time FFT, multispectral analysis, etc.) may be constructed to target the same frequency and time localization information pertinent to the non-stationary signals.

Figure 10:
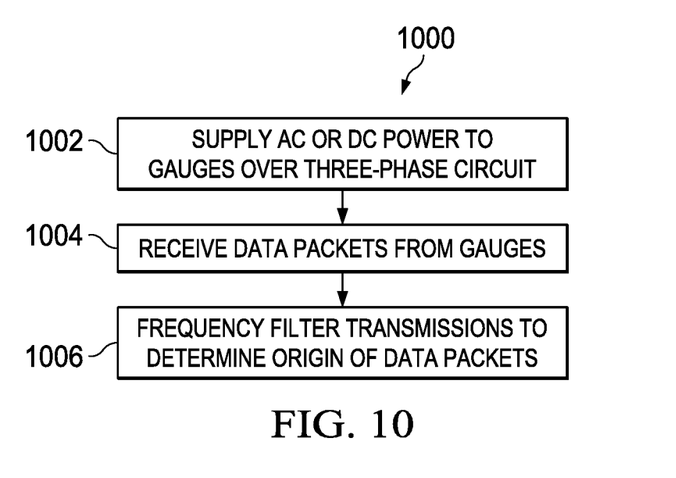
FIG. 10 is a flow chart of a process to transmit data over the power cable with a frequency modulated data signals.

FIG. 10 is a flow chart of a process 1000 to transmit data over the power cable 108 with a frequency modulated data signal. At block 1002, either AC or DC power is imposed onto the three-phase wye point 210 by the gauge surface panel 142 to power the gauges 602, 604A, 604B, and 606. Additionally, the gauges 602, 604A, 604B, and 606 may be powered by the AC or DC power imposed onto the wye point 210 regardless of a power state of the ESP motor 110. Further, the AC power supply may include a frequency of greater than 500 Hz.

At block 1004, a data packets may be received at the gauge surface panel 142 from one or more of the gauges 602, 604A, 604B, or 606. It may be appreciated that additional gauges may be included within the process 1000 for data transmission across the power cable 108. For example, data packets from four or more gauges 602, 604A, 604B, and 606 may be received at the gauge surface panel 142. Further, the first frequency, the second frequency, and any additional frequencies merited by the addition of more gauges may all be sufficiently differentiated such that the gauge surface panel 142 is able to easily filter the data signals and assign the resulting data to the appropriate gauges 602, 604A, 604B, and 606.

Accordingly, at block 1006, the data transmissions from the gauges may be frequency filtered by the gauge surface panel 142 in such a manner that the gauge surface panel 142 is able to assign the transmitted data to the appropriate gauges 602, 604A, 604B, and 606. By assigning the data to the appropriate gauge, a user may be able to observe a downhole or wellhead environment at several different positions along the well 112. Additionally, because the gauges 602, 604A, 604B, and 606 are able to transmit data simultaneously across the power cable 108, the gauge surface panel 142 may be able to provide information about the conditions of the well 112 with greater frequency than with the sequential technique described above. For example, the conditions within the well 112 may be updated by each gauge every minute or every thirty seconds without having to wait for data transmissions from the remainder of the gauges to finish.

Figure 11:
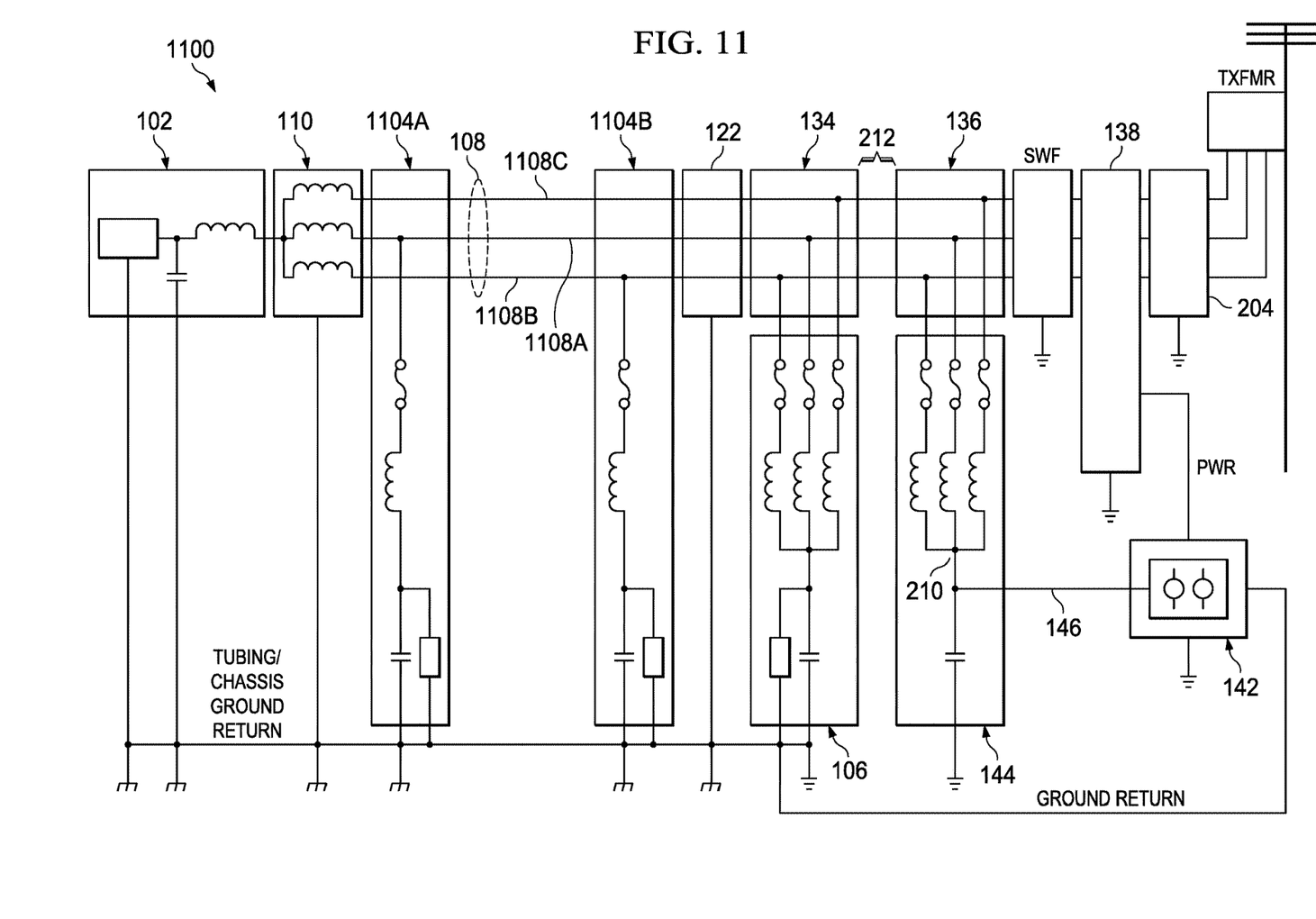
FIG. 11 is a circuit diagram of the hydrocarbon production environment of FIG. 1, including multiple gauges coupled to individual phases of the power cable.

Turning now to FIG. 11, a circuit diagram 1100 of the hydrocarbon production environment 100 of FIG. 1, including tubing gauges 1104A and 1104B coupled to individual phases 1108A and 1108B of the power cable 108, is illustrated. It may be appreciated that while only the tubing gauges 1104A and 1104B are depicted as being coupled to the individual phases 1108A and 1108B, more gauges may be positioned along the power cable 108 and also coupled to the individual phases 1108A and 1108B. Additionally, gauges may also be coupled to an individual phase 1108C, which makes up a third phase of the three-phase power cable 108. Because the gauges 1104A and 1104B are coupled to individual phases 1108A and 1108B, the gauges 1104A and 1104B are not coupled to wye points of the power cable 108. Further, other gauges, such as the downhole gauge 102 and the wellhead gauge 106, may also couple to the power cable 108, but the downhole gauge 102 and the wellhead gauge 106 may couple to the power cable at the wye points provided by the ESP motor 110, the junction box 134, or any other wye point created by the addition of another gauge along the power cable 108.

When an issue arises in one of the phases 1108A, 1108B, or 1108C of the power cable 108, such as a ground fault, transmission of data from a gauge 102 or 106 coupled to the three-phases of the power cable 108 may be inhibited. For example, in the illustrated example, if a phase issue occurs on the phase 1108C, the downhole gauge 102 and the wellhead gauge 106 may no longer be able to communicate with the gauge surface panel 142 across the power cable 108. However, the tubing gauges 1104A and 1104B may continue to communicate with the gauge surface panel 142 across the individual phases 1108A and 1108B, respectively. Accordingly, while a full ESP system picture may not be available from all of the gauges 102, 1104A, 1104B, and

106, an operator may still have access to data supplied by the gauges 1104A and 1104B as long as the phases 1108A and 1108B continue to be functional.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a power and data delivery system for downhole sensors of a well, comprising a three-phase power supply coupled to a power cable to supply power to a downhole motor positioned along a wellbore; the power cable configured to transmit power and to transmit data signals; a downhole gauge coupled to the downhole motor, wherein the downhole gauge is configured to transmit downhole data signals along the power cable to a gauge surface panel; and at least one gauge positioned remotely from the downhole gauge and coupled to the power cable, wherein the at least one gauge is configured to transmit gauge data signals along the power cable to the gauge surface panel.

Clause 2, the power and data delivery system of clause 1, wherein the at least one gauge comprises a wellhead gauge positioned near a wellhead of the well.

Clause 3, the power and data delivery system of clause 2, wherein the wellhead gauge is coupled to the power cable at a wye point generated by a choke coupled to a vent box, a J-box, or any three-phase splice at a surface of the well.

Clause 4, the power and data delivery system of at least one of clauses 1-3, wherein the at least one gauge comprises at least one tubing gauge positioned along production tubing within the wellbore.

Clause 5, the power and data delivery system of clause 4, wherein the at least one tubing gauge is coupled to the power cable at a wye point generated by a choke.

Clause 6, the power and data delivery system of at least one of clauses 1-5, wherein the at least one gauge comprises a first tubing gauge positioned along tubing of the well above a fluid level of the well, a second tubing gauge positioned along the tubing of the well below the fluid level of the well and above the downhole motor, and a third tubing gauge positioned along the tubing of the well below the downhole motor.

Clause 7, the power and data delivery system of at least one of clauses 1-6, wherein the downhole motor is an electrical submersible pumping (ESP) motor, and the downhole gauge is configured to measure a temperature of the ESP motor.

Clause 8, the power and data delivery system of at least one of clauses 1-7, wherein the downhole gauge and the at least one gauge comprise AC powered gauges, and the AC powered gauges are configured to transmit the downhole data signals and the gauge data signals simultaneously across the power cable.

Clause 9, the power and data delivery system of at least one of clauses 1-7, wherein the downhole gauge and the at least one gauge comprise DC powered gauges, and the DC powered gauges are configured to alternate between sending the downhole data signals and the gauge data signals across the power cable.

Clause 10, a method to receive data from multiple gauges of a well, the method comprising supplying three-phase power to a downhole electrical submersible pumping (ESP) motor positioned within a wellbore via a power cable comprising a first, second, and third conductor; receiving a first data packet from a first gauge of the well via the power cable when a first environment is reached; and receiving a second data packet from a second gauge of the well via the power cable when a second environment is reached.

Clause 11, the method of clause 10, wherein the first gauge comprises a downhole gauge coupled to the ESP motor, and the second gauge comprises a wellhead gauge coupled to a vent box, a J-box, or any three-phase splice of the well.

Clause 12, the method of clause 11, further comprising receiving a third data packet from a third gauge of the well via the power cable when a third environment is reached, wherein the third gauge comprises a tubing gauge coupled to the power cable along tubing within a wellbore of the well.

Clause 13, the method of at least one of clauses 10-12, wherein the first gauge and the second gauge are DC or AC powered gauges, and the first environment comprises a first time after the first gauge commences operation, the second environment comprises a second time after the second gauge commences operation, and the first time and the second time do not overlap such that the first data packet and the second data packet are received at different times.

Clause 14, the method of at least one of clauses 10-12, wherein the first gauge and the second gauge are DC or AC powered gauges, and the first environment and the second environment overlap in such a manner that the first data packet and the second data packet are received simultaneously.

Clause 15, the method of at least one of clauses 10-14, wherein the first environment comprises a first voltage provided on the power cable, and the second environment comprises a second voltage provided on the power cable, wherein the first voltage is different from the second voltage.

Clause 16, the method of clause 15, wherein the first gauge is configured to detect when the first voltage is provided on the power cable and transmit the first data packet only when the first voltage is provided on the power cable, and the second gauge is configured to detect when the second voltage is provided on the power cable and transmit the second data packet only when the second voltage is provided on the power cable.

Clause 17, a power and data delivery system for downhole sensors of a well, comprising a three-phase power supply coupled to a power cable to supply power to a downhole motor positioned within a wellbore, the power cable comprising a first, second, and third conductor over which power and data signals are transmitted; a first gauge coupled to the first conductor of the power cable, wherein the first downhole gauge is configured to transmit a first packet of data signals on the first conductor; a second gauge coupled to the second conductor of the power cable, wherein the second downhole gauge is configured to transmit a second packet of the data signals on the second conductor; and a third gauge coupled to the third conductor of the power cable, wherein the third downhole gauge is configured to transmit a third packet of the data signals on the third conductor.

Clause 18, the power and data delivery system of clause 17, wherein the first gauge is coupled to the downhole motor, the second gauge is positioned along tubing within the wellbore, and the third gauge is communicatively coupled to a wellhead of the well.

Clause 19, the power and data delivery system of clause 17 or 18, wherein the first gauge, the second gauge, and the third gauge are each positioned along tubing within the wellbore.

Clause 20, the power and data delivery system of at least one of clauses 16-19, wherein the first gauge, the second gauge, and the third gauge are each configured to continue transmitting the data signals on the respective first, second, and third conductors in the event that one or more of the other conductors coupled to the one or more other respective gauges experience an issue that precludes transmission on the one or more other conductors.

Clause 21, the power and data delivery system of at least one of clauses 16-20, wherein the first, second, and third gauges are configured to couple to the power cable at an existing junction with the power cable or at a gauge created junction with the power cable.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A power and data delivery system for downhole gauges of a well, comprising:
    a three-phase power supply coupled to a power cable to supply power to a downhole motor positioned along a wellbore;
    the power cable configured to transmit power and to transmit data signals;
    a downhole gauge coupled to the downhole motor at a first environment of the wellbore, wherein the downhole gauge is configured to transmit downhole data signals along the power cable to a gauge surface panel; and
    at least one gauge positioned at a second environment of the wellbore, remote from the downhole gauge and coupled to the power cable, wherein the at least one gauge is configured to transmit gauge data signals along the power cable to the gauge surface panel;
    wherein the first environment comprises a first voltage provided on the power cable, and the second environment comprises a second voltage provided on the power cable, wherein the first voltage is different from the second voltage;
    wherein the first voltage reflects operating conditions at the first environment and the second voltage reflects other operating conditions at the second environment.

2. The power and data delivery system of claim 1, wherein the at least one gauge comprises a wellhead gauge positioned near a wellhead of the well.

3. The power and data delivery system of claim 2, wherein the wellhead gauge is coupled to the power cable at a wye point generated by a choke coupled to a vent box, a J-box, or any three-phase splice at a surface of the well.

4. The power and data delivery system of claim 1, wherein the at least one gauge comprises at least one tubing gauge positioned along production tubing within the wellbore.

5. The power and data delivery system of claim 4, wherein the at least one tubing gauge is coupled to the power cable at a wye point generated by a choke.

6. The power and data delivery system of claim 1, wherein the at least one gauge comprises a first tubing gauge positioned along tubing of the well above a fluid level of the well, a second tubing gauge positioned along the tubing of the well below the fluid level of the well and above the downhole motor, and a third tubing gauge positioned along the tubing of the well below the downhole motor.

7. The power and data delivery system of claim 1, wherein the downhole motor is an electrical submersible pumping (ESP) motor, and the downhole gauge is configured to measure a temperature of the ESP motor.

8. The power and data delivery system of claim 1, wherein the downhole gauge and the at least one gauge comprise AC powered gauges, and the AC powered gauges are configured to transmit the downhole data signals and the gauge data signals simultaneously across the power cable.

9. The power and data delivery system of claim 1, wherein the downhole gauge and the at least one gauge comprise DC powered gauges, and the DC powered gauges are configured to alternate between sending the downhole data signals and the gauge data signals across the power cable.

10. A method to receive data from multiple gauges of a well, the method comprising:
    supplying three-phase power to a downhole electrical submersible pumping (ESP) motor positioned within a wellbore via a power cable comprising a first, second, and third conductor;
    receiving a first data packet from a first gauge of the well via the power cable when a first environment is reached; and
    receiving a second data packet from a second gauge of the well via the power cable when a second environment is reached;
    wherein the first environment comprises a first voltage provided on the power cable, and the second environment comprises a second voltage provided on the power cable, wherein the first voltage is different from the second voltage.

11. The method of claim 10, wherein the first gauge comprises a downhole gauge coupled to the ESP motor, and the second gauge comprises a wellhead gauge coupled to a vent box, a J-box, or any three-phase splice of the well.

12. The method of claim 11, further comprising receiving a third data packet from a third gauge of the well via the power cable when a third environment is reached, wherein the third gauge comprises a tubing gauge coupled to the power cable along tubing within a wellbore of the well.

13. The method of claim 10, wherein the first gauge and the second gauge are DC or AC powered gauges, and the first environment comprises a first time after the first gauge commences operation, the second environment comprises a second time after the second gauge commences operation, and the first time and the second time do not overlap such that the first data packet and the second data packet are received at different times.

14. The method of claim 10, wherein the first gauge and the second gauge are DC or AC powered gauges, and the first environment and the second environment overlap in such a manner that the first data packet and the second data packet are received simultaneously.

15. The method of claim 10, wherein the first gauge is configured to detect when the first voltage is provided on the power cable and transmit the first data packet only when the first voltage is provided on the power cable, and the second gauge is configured to detect when the second voltage is provided on the power cable and transmit the second data packet only when the second voltage is provided on the power cable.

16. A power and data delivery system for downhole sensors of a well, comprising:
   a three-phase power supply coupled to a power cable to supply power to a downhole motor positioned within a wellbore, the power cable comprising a first, second, and third conductor over which power and data signals are transmitted;
   a first gauge coupled to the first conductor of the power cable at a first environment of a wellbore, wherein the first gauge is configured to transmit a first packet of data signals on the first conductor;
   a second gauge coupled to the second conductor of the power cable at a second environment of the wellbore, wherein the second gauge is configured to transmit a second packet of the data signals on the second conductor; and
   a third gauge coupled to the third conductor of the power cable, wherein the third gauge is configured to transmit a third packet of the data signals on the third conductor;
   wherein the first environment comprises a first voltage provided on the power cable, and the second environment comprises a second voltage provided on the power cable, wherein the first voltage is different from the second voltage;
   wherein the first voltage reflects operating conditions at the first environment and the second voltage reflects other operating conditions at the second environment.

17. The power and data delivery system of claim 16, wherein the first gauge is coupled to the downhole motor, the second gauge is positioned along tubing within the wellbore, and the third gauge is communicatively coupled to a wellhead of the well.

18. The power and data delivery system of claim 16, wherein the first gauge, the second gauge, and the third gauge are each configured to continue transmitting the data signals on the respective first, second, and third conductors in the event that one or more of the other conductors coupled to the one or more other respective gauges experience an issue that precludes transmission on the one or more other conductors.

19. The power and data delivery system of claim 16, wherein the first, second, and third gauges are configured to couple to the power cable at an existing junction with the power cable or at a gauge created junction with the power cable.

20. The power and data delivery system of claim 16, wherein the first gauge and the second gauge are DC or AC powered gauges, and the first environment and the second environment overlap in such a manner that the first data packet and the second data packet are received simultaneously.

* * * * *